W. A. BUCHANAN.
THILL COUPLING.
APPLICATION FILED SEPT. 19, 1917.
1,283,652.
Patented Nov. 5, 1918.
2 SHEETS—SHEET 1.
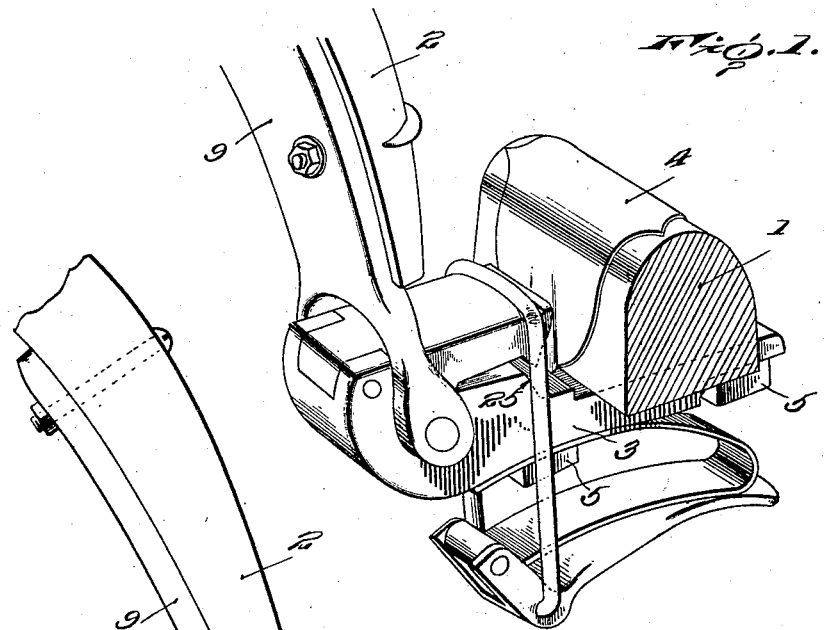
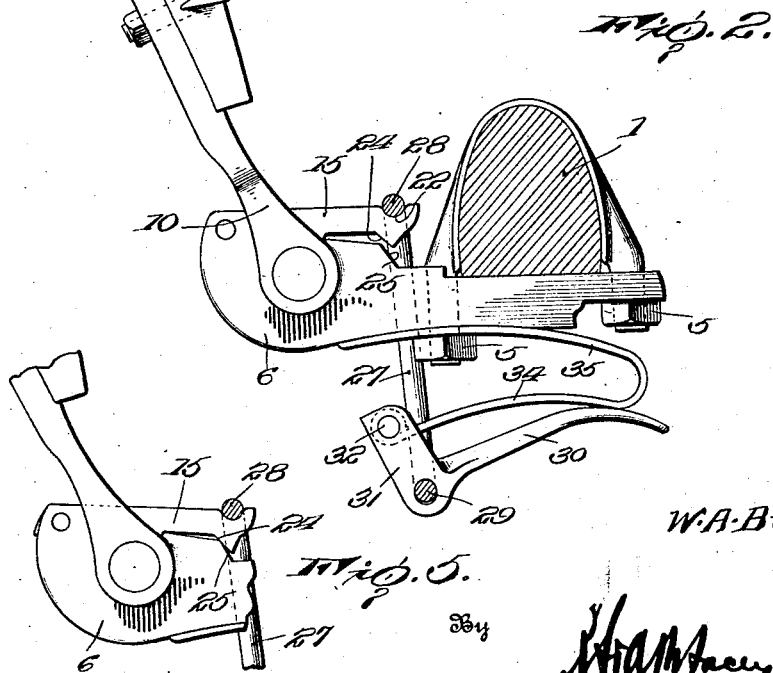
Inventor
W. A. Buchanan
By
Attorneys.

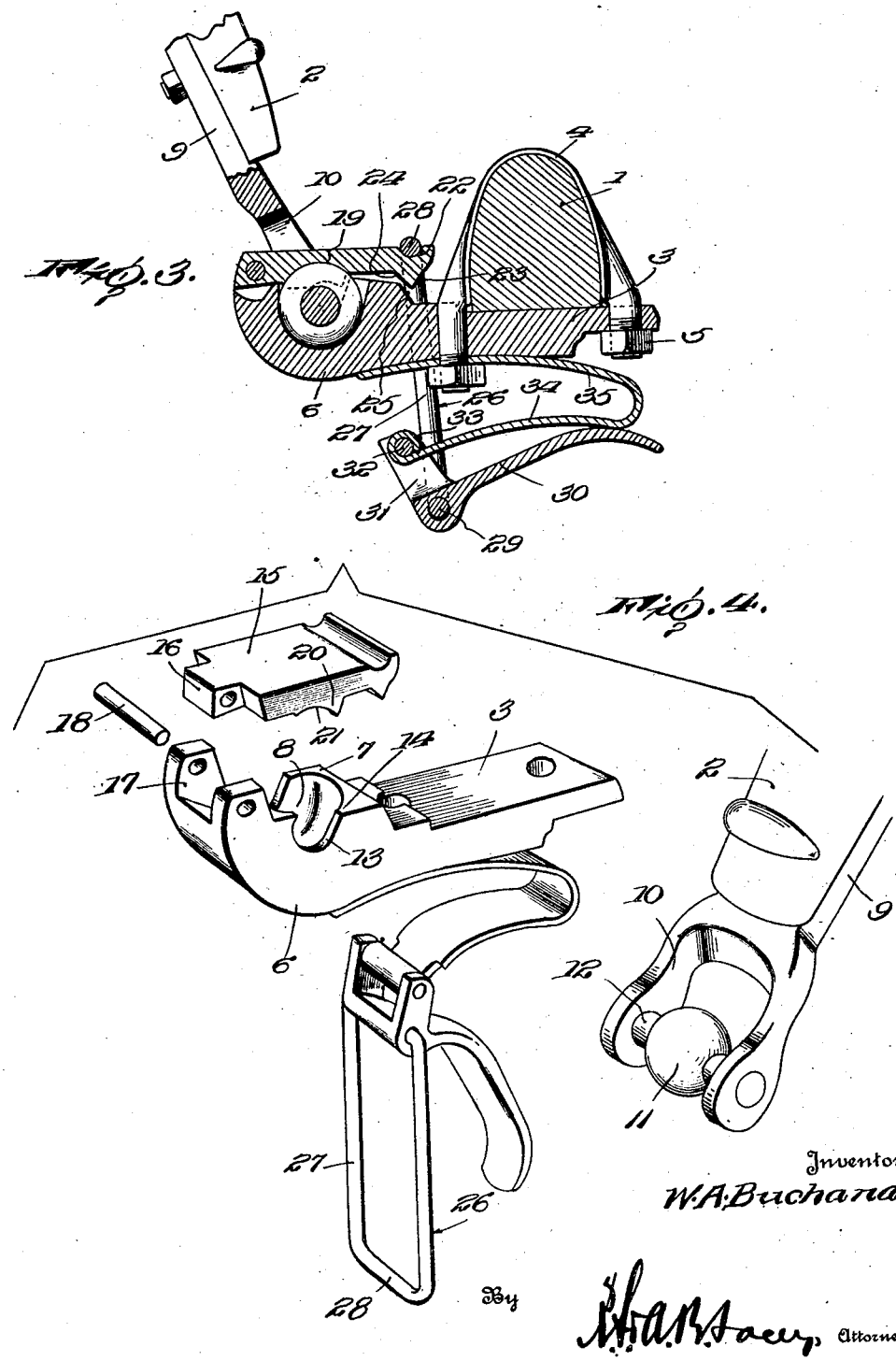

UNITED STATES PATENT OFFICE.

WILLIAM A. BUCHANAN, OF ASHEVILLE, NORTH CAROLINA.

THILL-COUPLING.

1,283,652.
Specification of Letters Patent.
Patented Nov. 5, 1918.

Application filed September 19, 1917. Serial No. 192,168.

*To all whom it may concern:*

Be it known that I, WILLIAM A. BUCHANAN, a citizen of the United States, residing at Asheville, in the county of Buncombe and State of North Carolina, have invented certain new and useful Improvements in Thill-Couplings, of which the following is a specification.

This invention relates to thill couplings of the anti-rattling type and has as its primary object to provide a thill coupling of this class which may be quickly and readily opened and closed to permit of the connection and disconnection of the thill and which when in use will be entirely noiseless and in no way likely to become accidentally unlocked or released.

Another aim of the invention is to so construct the thill coupling that wear of the ball and socket members thereof will be automatically taken up so that even after a long period of use the coupling will still be noiseless while driving.

Another object of the invention is to so construct the thill coupling that the same may be conveniently applied to an axle, the nuts upon the attaching clip being so positioned as to be readily accessible.

The invention aims further to so construct the thill coupling that even should the parts thereof become greatly worn, they will still snugly fit one another so as to provide against rattling.

Another object of the invention is to so construct the coupling that the use of bushings will be entirely obviated.

In the accompanying drawings:

Figure 1 is a perspective view of the thill coupling embodying the present invention;

Fig. 2 is a side elevation thereof, the coupling being shown closed;

Fig. 3 is a vertical front to rear sectional view through the coupling in closed condition;

Fig. 4 is a group perspective view illustrating the several parts of the coupling disassembled;

Fig. 5 is a view similar to Fig. 2 but illustrating the condition of the coupling after the ball and socket members thereof have become greatly worn.

In the drawings, the numeral 1 indicates the axle of a vehicle and the numeral 2 one of the thills thereof. The coupling embodying the invention comprises an axle member and a thill member and the said axle member includes an attaching plate 3 which is disposed against the under side of the axle 1 and is secured in place by means of an axle embracing clip 4 the arms of which extend downwardly through the said plate 3 and have fitted thereto bolts 5 which bear against the under side of the plate to secure the same in place. As will be presently pointed out the nuts 5 are so located that they will be readily accessible so that no difficulty will be experienced in applying and removing the axle member of the coupling. At its forward end the plate 3 is formed with a head 6, the upper face of which is substantially flat and is indicated by the numeral 7. This face of the head is formed with a socket 8, the bottom portion of which is substantially semi-spherical so as to receive the ball member of the coupling, as will be presently explained, the socket being, furthermore, of a depth nearly equal to the diameter of the ball member so that the said member will be practically completely housed within the said socket. The ball element above referred to comprises a part of the thill member of the coupling and this member consists of a thill iron 9, which is secured to the under side of the thill 2 and which at its rear or lower end is provided with spaced arms 10 supporting between them the said ball element which comprises a spherical head 11 and short trunnion portions 12 which extend from diametrically opposite sides of the head and are integral therewith and united to the ends of the arms 10. As stated, the ball element 11 is seated within the socket 8 formed in the upper side of the head 6 and in order to accommodate the trunnions 12, the sides of the head 6 are formed with notches 13, the lower portions of which are substantially semi-circular, the said walls of the notches being inclined upwardly and rearwardly, as indicated by the numeral 14 for a purpose to be presently explained. It will be apparent by reference to the drawings that the notches are deeper than the trunnion portions 12 so that these portions are securely seated within the notches when the two members of the coupling are properly assembled. In order to close the socket 8 and retain the ball element therein, there is provided a cap plate, indicated by the numeral 15, the cap plate being provided at its forward end with a pintle lug 16 which seats between pintle ears 17 which project upwardly from the face 7 of the head 6 in spaced relation to each other, a pivot pin 18 being fitted through the said ears and the lug 16. The plate 15 in its under side is formed with a socket 19 which is of spherical contour but which is much shallower than the socket 8 and by reference to Fig. 3 of the drawings it will be understood that when the cap plate 15 is closed the wall of the socket 19 will bear against the upper side of the ball element 11 thus holding the ball element firmly seated within the socket 8 and closing the said socket. In order that the notches 13 may be closed, the under side of the cap plate 15 is formed at the opposite sides of the socket 19 with depending lugs 20, the lower edges or sides of which are curved on the arc of a circle, as indicated by the numeral 21. By reference to Fig. 3 of the drawings it will be understood that when the plate 15 is closed the lugs 20 will seat within the upper open ends of the notches 13. It will be understood, of course, that the curved under sides or edges 21 of the lugs 20 coact with the semi-circular bottom portions of the notches 13 to form bearings for the trunnion portions 12, in the same manner that the socket 19 coacts with the socket 8 to form a bearing for the ball element 11. In its upper face the plate 15 is formed at its free end with a transversely extending groove 22, the purpose of which will be presently explained, and directly below this groove and upon its under face the plate 15 is formed with a transverse lip 23, the forward face of which is beveled, as indicated by the numeral 24. Normally, the beveled surface of the lip 23 is spaced above an inclined surface or wall 25 located at the rear of the head 6. However, as the ball and socket members become worn the beveled surface 24 is designed to come in contact with the inclined face 25, as shown in Fig. 5 of the drawings, in a wedging manner so that as downward pressure is exerted upon the free end of the cap plate 15, a slight rearward pull will also be exerted upon the pivot pin 18, thereby so binding the parts as to prevent rattling of the said plate and at the same time relieving the pivot pin of considerable strain. It will also be observed that the bevel of the surface 24 is greater than the inclination of the wall or face 25.

The numeral 26 indicates in general a bail comprising spaced sides 27, a connecting top portion 28, and a connecting lower portion 29. The portion 28 is designed to seat within the transverse groove 22 in the manner clearly shown in Fig. 3 of the drawings and means is connected with the bottom portion 29 of the bail to exert a downward pull upon the bail to firmly hold the cap plate 15 in closed position. The side portions 27 of the bail extend downwardly beside the lateral faces of the head 6 and pivotally mounted upon the bottom portion 29 of the said bail is a finger lever 30, the lever being provided at its pivoted end with spaced upstanding lugs 31 connected by a transverse pin 32. This pin passes through a pintle eye 33 formed at the end of one arm 34 of a bowed leaf spring, the other arm of which spring is indicated by the numeral 35. The arm 35 of the spring is disposed against the under face of the plate 3 and is secured in place by means of the nut 5 upon the forward arm of the clip 4, there being sufficient space between the arms 34 and 35 of the spring to permit of the ready insertion of a wrench in applying the same to the said nut. It will now be understood that when the finger lever 30 is manipulated to swing the same to the position shown in Figs. 1, 2 and 3 of the drawings, the upper side of the lever at its free end will rest against the under side of the arm 34 of the spring and as the pin 32 has, in such manipulation of the lever, been moved forwardly beyond a vertical line passing through the pin 29, the parts will remain in this position. With the parts in this position the spring exerts a downward pull upon the bail 26, thereby firmly holding the cap plate 15 in closed position, the downward pressure exerted by the plate upon the ball element 11 serving to firmly seat the ball element within the socket 8 although the thill may have pivotal movement. Of course, when the finger lever 30 is swung downwardly, the lever 30 will pivot upon the pin 32, thereby permitting of the bail 26 being raised so as to clear the cap plate 15 and permit of the said plate being swung upwardly to provide for disengagement of the ball element 11 from the socket 8.

Having thus described the invention, what is claimed as new is:

1. In a thill coupling, a member formed with a head, the rear side of which is upwardly and forwardly inclined, the said head in its upper side being formed with a seat located forwardly of the said inclined surface of the head, a cap plate pivotally connected at its forward end with the forward end of the head and provided in its under side with a seat opposing the seat in the upper face of the head, the said cap plate being formed upon its under side at its rear end with a transversely extending lip, the forward face of which is beveled, the said forward face of the lip being located immediately rearwardly of and inclined at a different angle from the angle of inclination of the said rear side of the head, a thill iron having an element fitting in the seats and retained in place by the said cap plate, and a locking means for the said cap plate including a spring actuated element which engages the upper side of the cap plate and forces the same in the direction of the said head whereby when lost motion occurs at the pivot for the plate, the spring pressure will force the beveled lip into contact with the inclined rear side of the head to take up said lost motion and prevent rattling.

2. In a thill coupling, the combination of a plate formed with an enlarged head provided with a flat upper surface in which is formed a substantially centrally disposed semi-spherical depression forming the major portion of a thill socket, the head having notches in the side walls opening through the flat surface thereof and which communicate with the semi-spherical depression, the rear portion of said head forming a shoulder, a substantially flat jaw hinged to the forward top portion of the head and provided with a rear depending lip which coöperates with the shoulder on the head, the upper surface of the lip having a transverse groove inside the plane of the shoulder, the underside of the flat jaw having a substantially centrally disposed semi-spherical depression which registers with the semi-spherical depression in the head when the flat jaw is thrown toward the flat surface of the head to form a substantially spherical socket for a thill iron, the semi-spherical depression in the head being of greater depth than the depression in the flat jaw, the flat jaw having side lugs adjacent the semi-spherical depression, the lugs having curved depressions in their underside, said lugs fitting in and forming with the notches in the head bearings, a spring actuated loop engaging in the transverse groove in the top of the lip of the flat jaw to normally draw said jaw toward the flat surface of the head, and a thill iron provided with a spherical head and lateral reduced trunnions, the spherical head fitting in the socket formed by the semi-spherical depressions in the enlarged head and flat jaw, the major portion of the said spherical head being below the horizontal plane of the flat surface of the enlarged head, and the lateral trunnions fitting in the bearings formed by the notches and the depending lugs.

In testimony whereof I affix my signature.

WILLIAM A. BUCHANAN. [L. S.]

Copies of this patent may be obtained for five cents each, by addressing the "Commissioner of Patents, Washington, D. C."